Patented May 19, 1936

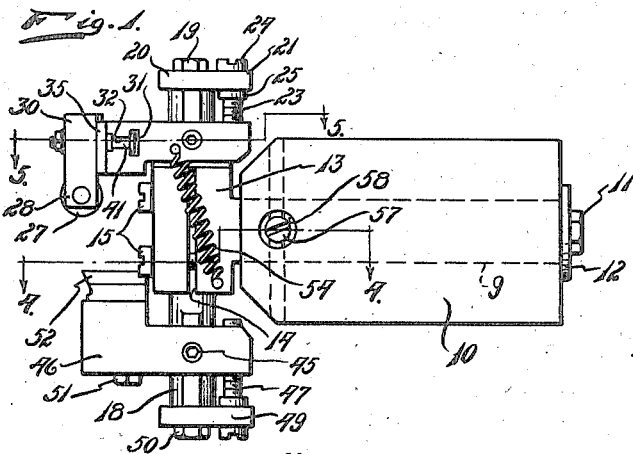

2,041,251

UNITED STATES PATENT OFFICE 2,041,251

SHAVING TOOL HOLDER

George Klein, Dearborn, Mich.

Application May 6, 1935, Serial No. 20,028

7 Claims. (Cl. 82—35)

My invention relates to a new and useful improvement in a shaving tool holder adapted for use particularly with automatic screw machines of the multiple type and it has for its object the provision of a shaving tool which will be simple in structure, economical of manufacture, durable, highly efficient in use and compact.

Another object of the invention is the provision of a shaving tool holder whereby the articles operated thereon may be maintained accurately formed within the required tolerances free from any imperfections resulting from vibrations or chatterings of the instrument.

Another object of the invention is the provision of a mechanism in which an adjustable workguide so arranged and constructed that the tool and the guide may float through a limited range and thus compensate for mis-alignment of the individual spindles.

Another object of the invention is the provision in a shaving tool holder of this class of a tool and an adjustable workguide which may be adjusted angularly relative to the holder so as to compensate for tapers and avoid tapering resulting from improper alignment.

Another object of the invention is the provision in a tool holder of this class of mechanism whereby a workguide and the shaving tool may be, as a unitary structure, tilted to the vertical for compensating for imperfections in the work piece or in alignment.

Other objects will appear hereinafter.

The invention consists in the combination and arrangement of parts hereinafter described and claimed.

The invention will be best understood by a reference to the accompanying drawing which forms a part of this specification and in which, Fig. 1 is a side elevational view of the invention.

Fig. 2 is a front elevational view of the invention.

Fig. 3 is a sectional view taken on line 3—3 of Fig. 2.

Fig. 4 is a fragmentary sectional view taken on line 4—4 of Fig. 1.

Fig. 5 is a fragmentary sectional view taken on line 5—5 of Fig. 1.

Fig. 6 is a sectional view taken on line 6—6 of Fig. 3.

In the drawing I have illustrated the tool comprising a shank 9 which is projected through and secured to the block 10 which forms a part of the machine with which used. A screw 11 engaging with its head the washer 12 threads into the end of the shank 9 and thus secures the block 10 into position. The shank 9 is provided with a split head 13, this head being split at 14 and the split ends thereof being movable towards each other by means of the screws 15 so as to clamp about the bushing 16 which is keyed by the key 17 against rotation relatively to the post 18 which it embraces. This post 18 is movable axially in the bushing 16.

Mounted by means of the screw 19 on the upper end of the post 18 is a plate 20 having a portion 21 projected outwardly therefrom and provided with a slot 22 in which rotatably engages the screw 23 having the head 24 and the collar 25 which engage opposite sides of the plate 20 so that the screw is swivelly mounted in this plate. The screw 23 threads into the bracket 26 which serves as a suitable support for the guide roller 27. This guide roller is rotatably mounted between the lugs 28 and 29 which project downwardly from the block 30. Formed in the bracket 27 so as to extend transversely thereof, is a slot 31 communicating with the passage 32. This passage terminates in the recess 33 in which the neck, projecting rearwardly from the plate 35, engages. This plate 35 is provided on its forward face with a recessed portion 36 to form edge flanges 37 and 38 which embrace the rib 39 projecting rearwardly from the block 30. A vertically extended slot 40 is formed in the block 30 so that the bolt 41 may project through the block. This bolt is provided with a head 42 which engages in the slot 31 so that the block 30 is mounted for movement transversely of the bracket 26 and vertically of this bracket. In the transverse movement the plate 35 together with the bolt 41 moves in unison with the block 30. In the vertical movement the block 30 would move by itself. A nut 43 and a washer 44 are provided on the outer end of the bolt 41 so that the block 30 may be locked in its various positions of movement. By rotating the screw 23 the bracket may be moved axially of the post 18 so that it may be retained in various positions axially of this bracket, and locked in its various positions by means of the set screw 45.

The post 18 projects through the tool bearing support 46 which may be moved axially of the post 18 by means of the screw 47 which is swivelly mounted in the slot 48 formed in the plate 49 which is mounted in the lower end of the post by the screw 50. The bolt 51 threads into the shaving tool 52 and serves to maintain the shaving tool in fixed position on the support 46. The opening 53 through which the bolt 51 projects is of such dimension as to permit of adjustment of the cutting tool 52 inwardly and outwardly from the post 18 so that as the tool is ground away or re-sharpened it may be moved outwardly to the proper cutting position so as to maintain the cutting edge thereof in alignment with the diameter 27.

A spring 54 is secured at one end to the bracket 26 and at its opposite end to the head 13 to normally maintain the post together with the bracket 26 and the support 46 moved downwardly on the post 18. These parts, however, move in unison with each other so that a unitary structure is afforded and, thus, the cutting tool and the guide roller may move upwardly and downwardly to compensate for variations in alignment. Thus, there is provided a floating mounting.

The post 18 together with the bracket 26 and the support 47 may be rotated in the bushing 16 in the head 13. This may be effected by loosening the screw 17 to release from their clamping engagement with the bushing 16. In this way the cutting edge of the tool 52 may be inclined to the axis of the shank 9. This permits the effecting of a taper cut.

The shank 9 may be rotated in the block 10 in order to compensate for any tilt of the mechanism which may be present or which may be desired. This tilting of the shank 9 is effected through engagement of the set screws 55 and 56 which are threaded into the block 9 and engage the screw 57 which is projected through the enlarged opening 58 formed in the block 10 and threaded into the shank 9. It is obvious that by screwing the screws 55 and 56 the shank 9 may be moved circumferential in the block 10 within the termination of the slot 58.

While I have illustrated and described the preferred form of construction, I do not wish to limit myself to the precise details of structure shown, but desire to avail myself of such variations and modifications as come within the scope of the appended claims.

Having thus described my invention, what I claim as new and desire to secure by Letters Patent is:

1. In a shaving tool holder, a shank; a head on one end of said shank; a supporting post slidably projected through said head; a tool bearing support mounted on the lower end of said post; means for moving said tool bearing support longitudinally of said post; a bracket mounted on the opposite end of said post and projecting radially outwardly therefrom; threaded means for adjusting the longitudinal position of said bracket relatively to said post; a roller bearing block; means for mounting said block on said bracket adapted for vertical and horizontal movement thereon; and means for locking said roller bearing block in fixed relation to said bracket.

2. In a shaving tool holder, a stationary block; a shank projected through a passage formed in said block; a stud projecting outwardly from said shank and engaging in an opening projected radially into said passage, said opening being of sufficient size to permit play of said stud therein; a head on one end of said shank; a cutting tool and a guide roller supported on said head; and means engageable with said stud for tilting said head relatively to said block and locking the same in various positions of tilt.

3. In a shaving tool holder, a bracket; a roller bearing block; means for mounting said block on said bracket free for vertical movement relatively thereto, said bracket having a transversely extended slot formed therein terminating at its rearward end in a widened slot; a bolt having a head engaging in the widened portion of said slot and extending outwardly through the constricted portion of said slot and projecting through a vertically extending elongated slot in said roller bearing block; and a nut threaded on the outer end of said bolt for clamping said block against said bracket.

4. In a shaving tool holder, a shank; a head on one end of said shank; a supporting post slidably projected through said head; a bracket mounted on the upper end of said post and projecting radially, outwardly therefrom; a roller-bearing block; means for mounting said block on said bracket adapted for vertical and horizontal movement thereon; and means for locking said roller-bearing block in fixed relation to said bracket.

5. In a shaving tool holder, a stationary block having a passage formed therein; an elongated shank projected through said passage; a stud projecting radially outwardly from said shank; threaded means mounted on said block at opposite sides of said stud and engageable therewith and adapted upon being threaded relatively to said block for rotating said shank on its longitudinal axis; a head on one end of said shank; a post projected through said head; a cutting tool carried by said post; a bracket mounted on said post; and rollers supporting on said bracket for pressing a work-piece against said cutting tool.

6. In a shaving tool holder, a stationary block; a shank projected through a passage formed in said block; a stud projecting outwardly from said shank and engaging in an opening projected radially into said passage, said opening being of such size to permit play of said stud therein; a head on one end of said shank; a post projected through said head, said post being rotatable relatively to said head; means for locking said post against rotation in said head; a cutting tool and a guide roller supported on said post; and means engageable with said stud for tilting said head relatively to said block and locking the same in various positions of tilt.

7. In a shaving tool, a supporting member; a post slidably mounted on said supporting member and rotatable on its axis relatively to said supporting member; means for locking said post against rotation, said post projecting beyond opposite sides of said supporting member; a work piece engaging guide roller on said post at one side of said supporting member; and a cutting tool on said post at the opposite side of said supporting member.

GEORGE KLEIN.